(12) United States Patent
Morris

(10) Patent No.: US 6,718,100 B2
(45) Date of Patent: Apr. 6, 2004

(54) FIRE RESISTANT CONDUIT INSERT FOR OPTICAL FIBER CABLE

(75) Inventor: David Drew Morris, Newnan, GA (US)

(73) Assignee: Milliken & Company, Spartanburg, SC (US)

( * ) Notice: Subject to any disclaimer, the term of this patent is extended or adjusted under 35 U.S.C. 154(b) by 0 days.

(21) Appl. No.: 10/109,384

(22) Filed: Mar. 28, 2002

(65) Prior Publication Data

US 2003/0185527 A1 Oct. 2, 2003

(51) Int. Cl.⁷ ................................................. G02B 6/44
(52) U.S. Cl. .................... 385/100; 385/109; 385/110; 385/112; 174/95; 174/97; 174/99 R; 138/111; 138/115; 138/116; 138/117; 138/118; 138/123; 138/124; 254/134.3 FT; 428/34.5
(58) Field of Search ............................... 385/100, 109, 385/110, 112, 84; 174/95, 97, 99 R; 254/134.3 FT; 138/111, 115–118, 123, 124; 428/34.5

(56) References Cited

U.S. PATENT DOCUMENTS

| | | | |
|---|---|---|---|
| 2,585,054 A | 2/1952 | Stachura ...................... 174/36 |
| 2,742,388 A | 4/1956 | Russell ........................ 154/110 |
| 3,524,921 A | 8/1970 | Wolf ............................. 174/70 |
| 3,856,052 A | 12/1974 | Feucht ......................... 138/119 |
| 3,911,200 A | 10/1975 | Simons et al. ................ 174/36 |
| 3,939,875 A | 2/1976 | Osborn et al. .............. 138/178 |
| 3,996,968 A | 12/1976 | Bergman et al. ............ 138/118 |
| 4,282,284 A | * 8/1981 | George ......................... 442/67 |
| 4,478,661 A | 10/1984 | Lewis ........................... 156/92 |
| 4,582,093 A | 4/1986 | Hubbard et al. ............. 138/111 |
| 4,585,034 A | 4/1986 | Hubbard et al. ............. 138/111 |
| 4,605,818 A | * 8/1986 | Arroyo et al. ................ 174/107 |
| 4,619,291 A | 10/1986 | Shirian ......................... 138/109 |
| 4,674,167 A | 6/1987 | Hubbard et al. ............ 29/401.1 |
| 4,707,074 A | 11/1987 | Heywood .................. 350/96.23 |
| 4,741,593 A | 5/1988 | Fochler ..................... 350/96.23 |
| 4,745,238 A | 5/1988 | Kotthaus et al. ........... 174/101.5 |
| 4,762,751 A | * 8/1988 | Girgis et al. .................. 428/378 |
| 4,793,594 A | 12/1988 | Kumpf ........................ 254/134.3 |
| 4,836,968 A | 6/1989 | Cakmakci .................. 264/177.19 |

(List continued on next page.)

FOREIGN PATENT DOCUMENTS

| | | | | |
|---|---|---|---|---|
| WO | 00/79662 | 6/2000 | ............. | H02G/3/00 |
| WO | 01/22142 | 3/2001 | ............. | G02B/6/44 |

Primary Examiner—Brian Healy
Assistant Examiner—Daniel Petkovsek
(74) Attorney, Agent, or Firm—Terry T. Moyer; Thomas L. Moses

(57) ABSTRACT

A flexible fire resistant innerduct structure is configured to contain a cable within a conduit. The innerduct structure includes a pair of adjacent strip-shaped layers of flexible material that are joined along their longitudinal edges to define a channel through which the cable can extend longitudinally through the innerduct structure between the layers. The adjacent layers have differing widths between their longitudinal edges, whereby the wider layer bulges away from the narrower layer to impart an open configuration to the channel. Other features of the innerduct structure relate to the material of which it is formed. Such features includes the structure of the material, such as a woven structure, and further include properties such as melting point, tensile strength, fire resistance, elongation, coefficient of friction, crimp resistance and compression recovery.

15 Claims, 4 Drawing Sheets

U.S. PATENT DOCUMENTS

| | | | |
|---|---|---|---|
| 4,976,290 A | 12/1990 | Gelin et al. | 138/141 |
| 5,027,864 A | 7/1991 | Conti et al. | 138/177 |
| 5,029,815 A | 7/1991 | Kumpf | 254/134.3 |
| 5,034,180 A | 7/1991 | Steketee, Jr. | 264/516 |
| 5,074,527 A | 12/1991 | Kumpf | 254/134.3 |
| 5,180,458 A | 1/1993 | White | 156/87 |
| 5,391,838 A | 2/1995 | Plummer, III | 174/36 |
| 5,442,136 A | 8/1995 | Allen | 174/95 |
| 5,503,695 A | 4/1996 | Imoto et al. | 156/71 |
| 5,536,461 A | 7/1996 | King et al. | 264/209.3 |
| 5,538,045 A | 7/1996 | Piotrowski et al. | 138/147 |
| 5,563,975 A * | 10/1996 | Gorian et al. | 385/100 |
| 5,587,115 A | 12/1996 | Allen | 264/1.24 |
| 5,681,640 A * | 10/1997 | Kiser | 428/181 |
| 5,698,056 A | 12/1997 | Kamiyama et al. | 156/218 |
| 5,908,049 A | 6/1999 | Williams et al. | 138/125 |
| 5,985,385 A * | 11/1999 | Gottfried | 428/34.6 |
| 6,010,652 A | 1/2000 | Yoshida | |
| 6,147,015 A * | 11/2000 | Bureau | 442/29 |
| 6,165,604 A * | 12/2000 | Edwards et al. | 428/298.7 |
| 6,178,278 B1 * | 1/2001 | Keller et al. | 385/109 |
| 6,240,968 B1 | 6/2001 | Bigonzi-Jaker et al. | 138/115 |
| 6,262,371 B1 | 7/2001 | Allen | 174/68.1 |
| 6,304,698 B1 | 10/2001 | Morris | 385/100 |
| 6,398,190 B1 * | 6/2002 | Li | 254/134.4 |
| 2002/0097966 A1 * | 7/2002 | Zelesnik | 385/100 |

\* cited by examiner

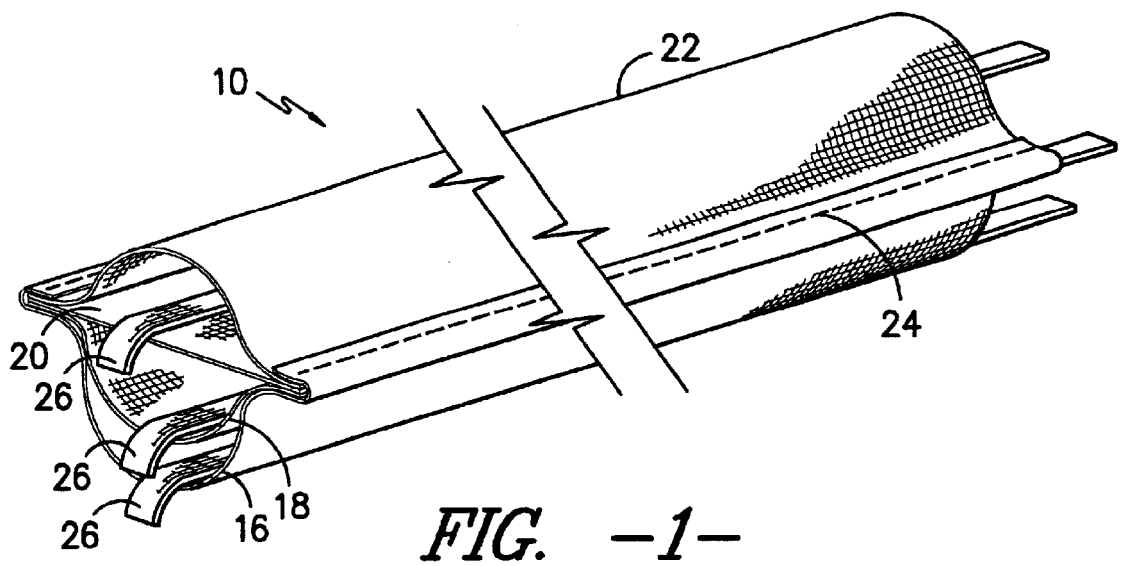
FIG. -1-
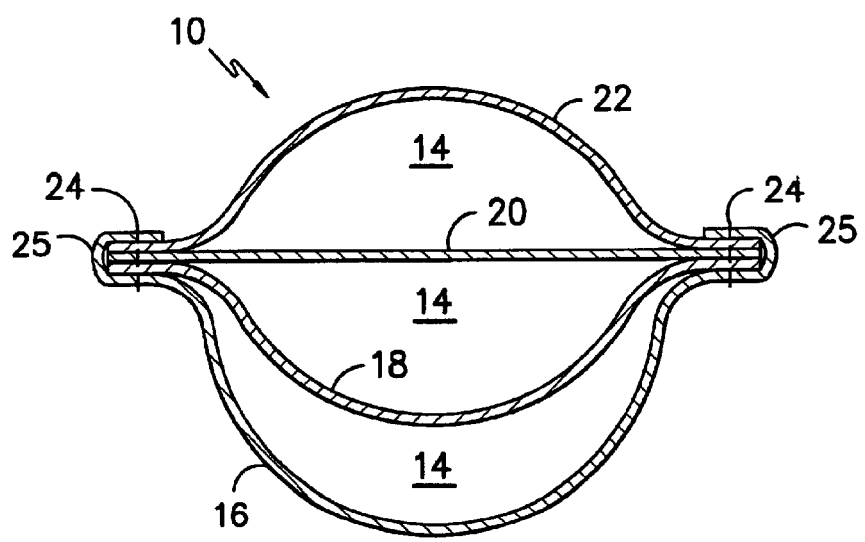
FIG. -2-

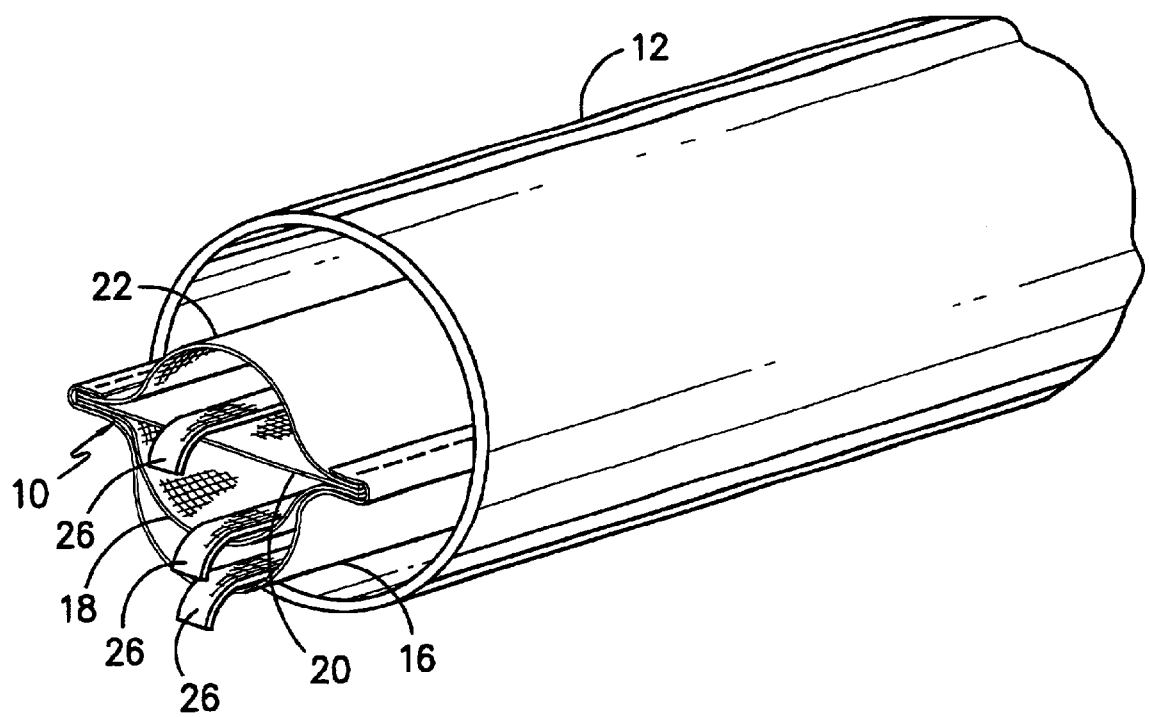
FIG. -3-

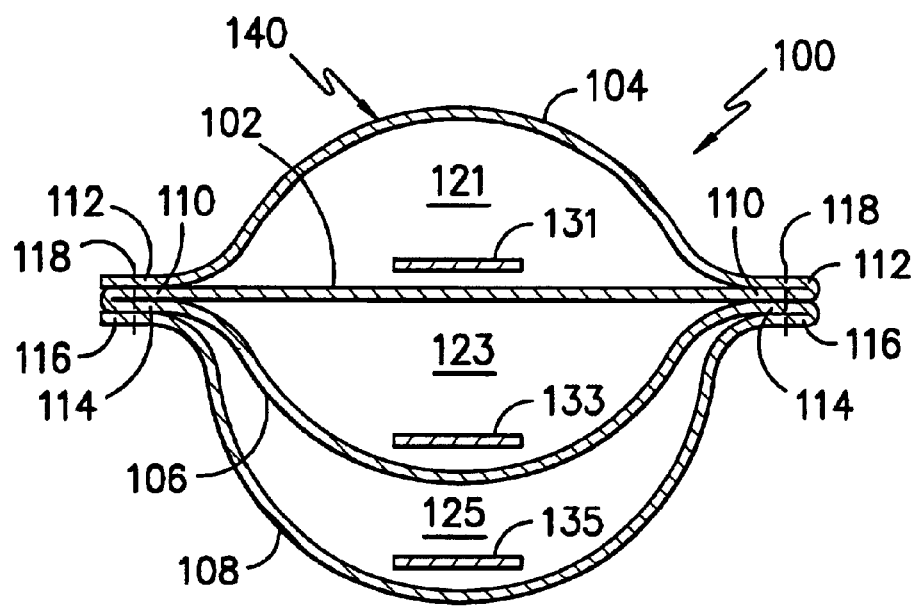
FIG. —4—
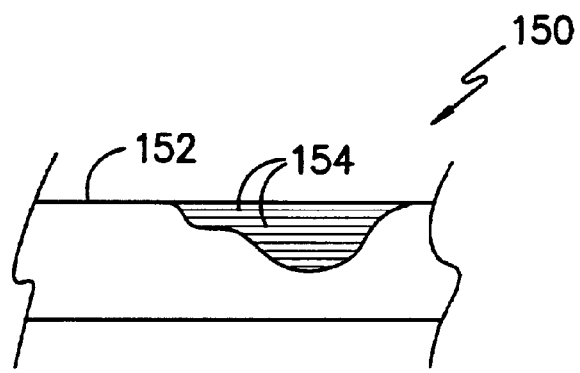
FIG. —5—
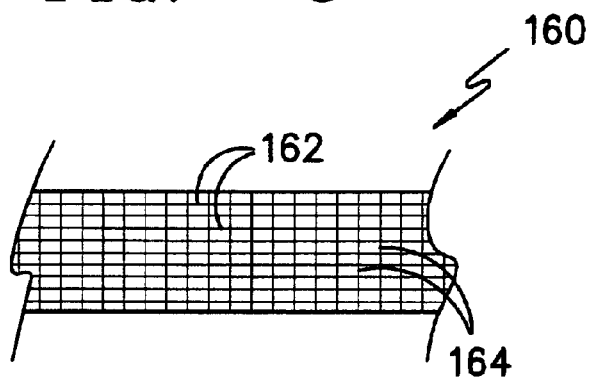
FIG. —6—

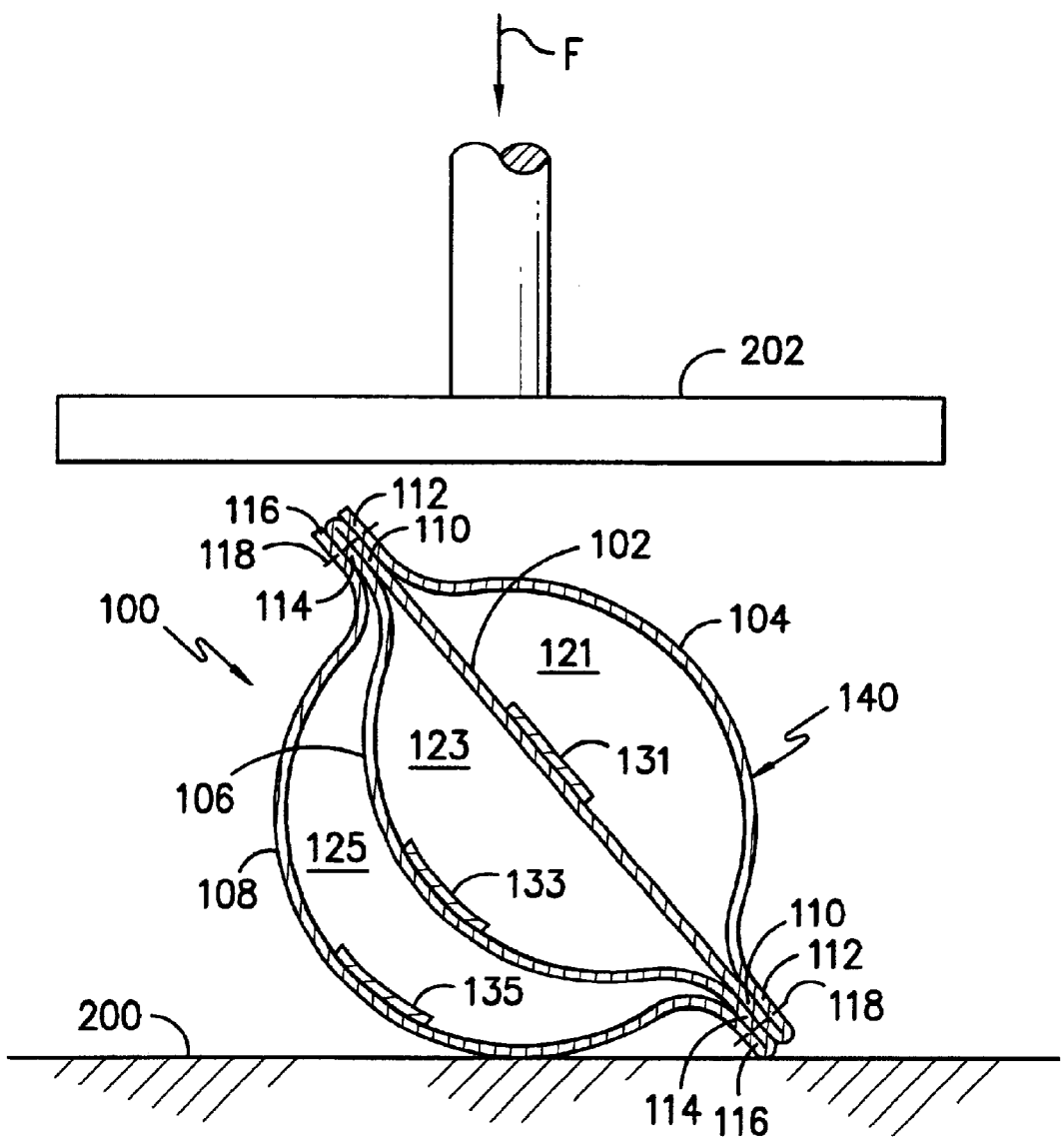
FIG. -7-
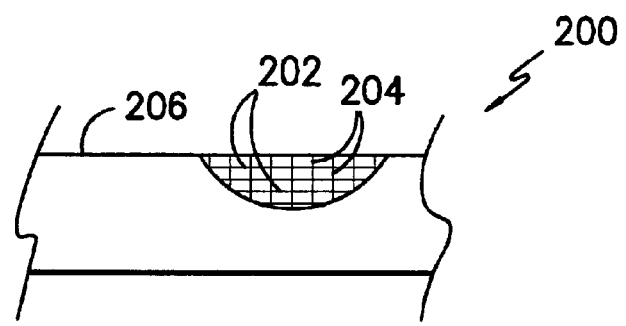
FIG. -8-

FIRE RESISTANT CONDUIT INSERT FOR OPTICAL FIBER CABLE

BACKGROUND OF THE INVENTION

The present invention generally relates to tubular conduit of the type that might be employed for the housing of underground cables, aerial cables, intrabuilding cables, such as fiber optic cable, coaxial cable, or the like. More particularly, the present invention relates to a fire resistant partitioning device, which may be inserted into such a conduit such that the conduit is divided into separate areas. Specifically, the present invention is directed toward an elongated partitioning device which is fire resistant and flexible, such that it may be inserted into a conduit which is already in place, which may already have at least one cable positioned therein, and which may have turns, bends, or the like therein.

Cable, such as fiber optic communication cable, is often provided underground in great lengths, and may even extend for many miles. It is known in the art to bury the cable in the ground so that the area above ground is not cluttered with the cable and its respective support apparatus. Furthermore, by positioning the cable underground, it is more protected from the weather and other potentially damaging circumstances.

It is also known in the cable art to position the cable within a conduit in order to more fully protect the cable in the ground. The conduit is often formed from lengths of polyvinyl chloride tubing or the like, which is laid in the ground. A rope is then blown through the conduit, and the rope in turn is attached to one of the communication cables. By pulling the rope, the cable is drawn through the conduit. Once in place within the conduit, the cable is protected from damage which may be caused by weather, water and the like.

It has been found that certain rodents will sometimes gnaw through an underground conduit. Hence, much underground conduit is employed which has a diameter of two inches or more, which is large enough to impede damage from most rodents. While such conduit provides excellent protection for communication cable, there is also much unused or "dead" space within such a conduit. With the advent of fiber optic cables, which may be only a half-inch or less in diameter, there is even more dead space within an average conduit.

When a conduit is in place, it may be subsequently desired to run a second communications cable at the same location. As such, it would be desirable from a cost and time standpoint to make use of the dead space within an existing conduit, rather than lay a new length of conduit. However, it has been found that it is difficult to merely insert a second cable into a conduit which already contains a first cable. When a rope is blown into a conduit already containing a cable, or a second cable is "snaked" through the conduit, they are often impeded by the first cable, making it impossible to insert the second cable.

It has been suggested to provide a divider to be inserted into a conduit in order to separate the conduit into discrete sections, thus making insertion of the second cable easier. A problem has been encountered in that when conduit is placed over long distances, undulations will invariably occur therein. Also, planned curves, such as at underpasses or the like, will often be encountered rendering the placement of known dividers therein difficult, if not impossible.

A need exists therefore for a device to separate or partition a conduit, such as an underground communication cable conduit, into discrete sections. The device must be capable of being inserted into a conduit that is already in place, which may undulate over many miles, and which may have sharp turns therein. A need also exists for a partitioning device which will provide for improved use of the space within a conduit. Further, a need exists for a partitioning device that may be used within buildings, and which would meet necessary building code requirements for fire resistance, while facilitating cable placement and maintaining installation performance.

SUMMARY OF THE INVENTION

The present invention comprises a flexible innerduct structure configured to contain a cable within a conduit. The innerduct structure includes a pair of adjacent strip-shaped layers of flexible material that are joined along their longitudinal edges to define a channel through which the cable can extend longitudinally through the innerduct structure between the layers. In accordance with a principal feature of the invention, the adjacent layers have differing widths between their longitudinal edges, whereby the wider layer bulges away from the narrower layer to impart an open configuration to the channel.

Other principal features of the invention relate to the material of which the innerduct structure is formed. Such features include the structure of the material, such as a woven structure, and further include properties such as melting point, tensile strength, elongation, coefficient of friction, crimp resistance, fire resistance and compression recovery.

BRIEF DESCRIPTION OF THE DRAWINGS

The invention shall become apparent from the description which follows, in view of the drawings in which:

FIG. 1 is an isometric view of a conduit insert apparatus comprising a first embodiment of the present invention;

FIG. 2 is a cross-sectional view of the apparatus of FIG. 1;

FIG. 3 is an isometric showing the apparatus of FIG. 1 within a conduit;

FIG. 4 is a cross-sectional view of an apparatus comprising a second embodiment of the invention;

FIG. 5 is a partial view of an optical fiber cable used in accordance with the invention;

FIG. 6 is a schematic view of a strip of innerduct layer material constructed in accordance with the invention;

FIG. 7 schematically shows the apparatus of FIG. 4 on a test device; and

FIG. 8 is a schematic view of another strip of innerduct layer material constructed in accordance with the invention.

DESCRIPTION OF PREFERRED EMBODIMENTS

Referring now to the drawings, the reference number 10 represents an insert, which may be referred to as an innerduct, to be inserted in an optical fiber cable conduit 12. As shown in FIG. 3, a single innerduct 10 is shown in a conduit 12, but it should be understood that multiple innerducts like the innerduct 10 can be inserted in a conduit 12 depending on the diameter of the conduit 12. For example, it is contemplated that three such innerducts can be inserted in a 4-inch diameter conduit providing nine channels for the insertion of fiber optic cable.

Each innerduct 10 defines of a plurality of channels 14 which are formed by interconnected layers of fabric 16, 18, 20 and 22, etc. In the first embodiment of the invention each innerduct 10 has three channels 14 formed by the above noted layers 16, 18, 20 and 22 which are interconnected at their opposite longitudinal side edge portions by having the edge portions 25 of the lower layer 16 overlap the edge portions of the other layers and, by sewing 24 or other suitable methods such as ultrasonic welding, connecting the layers 16, 18, 20 and 22 together.

The fabric material preferably is soft and pliable, allowing the innerduct 10 to be pulled through the conduit 12 without snagging or generating too much heat and also is diverse enough so that the cable in one channel 14 does not contact the cable in the next adjacent channel 14. To this end the layers 16, 18, 20 and 22 in the first embodiment are 100% plain woven nylon fabrics having a 520 denier monofilament in both the warp and fill direction woven with a pick and end count of 30 picks and 35 ends, although the pick and end count may fall into a preferred range of 25 to 35 picks and 30 to 40 ends. Further, this embodiment also includes a melamine cyanurate additive extruded within the yarns to impart fire resistance. The fabric has a weight of 5.2 oz. per square yard. It is understood that the monofilament denier can vary from 200–1000 denier and the pick and end could well be altered to provide the desired cover to prevent contact of the fiber optic cables.

As stated above, one preferred yarn is 520 denier nylon 6 monofilament but another yarn, such as a 520 denier polyester, can be used so long as it has the desired characteristics.

The innerduct 10 is preferable constructed in the following manner. The fabric layers 16, 18, 20 and 22 are initially woven in long wide shapes and are cut along the warp direction into strips with the center strip 20 being the narrowest, the next adjacent strips 18 and 22 being wider, and the strip 16 being the widest so that when the strips 16–22 are mated and joined at their longitudinal edge portions the channels 14 will be formed by the bulging of the wider strips 16, 18 and 22. After the strips 16, 18, 20 and 22 have been cut they are laid in between each of the adjacent strips. Then the opposite longitudinal side edge portions 25 of the lower strip 16 are folded over those of the other strips and are sewn to form the innerduct 10 shown in FIG. 1.

The innerduct 10 may be manufactured in long lengths for insertion in previously installed conduits 12, or may be installed in open plenum spaces, vertical or horizontal open spaces within a building such as elevator shafts, utility spaces, and electrical cable trays, etc. Each layer 16–22 is formed in a correspondingly long length by stitching or otherwise joining successive strips of the fabric material together end to end. Pull lines 26, which are preferably woven plastic or aramid tapes or plastic ropes, are tied to the optical fiber cables (not shown) at one end and are pulled through the channels 14 by grasping and pulling the lines 26 at the other end. The pull lines 26 are preferably placed over the layers 16, 18 and 20 before the layers 16–22 are overlapped and joined at their longitudinal edge portions.

As shown for example in FIG. 3, a single innerduct 10 is inserted in a conduit 12 having an inner diameter of 4". The strip-shaped fabric layer 20 is 3" wide, the layers 18 and 22 are 4" wide, and the layer 16 is 6" wide. The width of the narrowest layer is thus less than the inner diameter of the conduit 12. This helps to minimize frictional engagement of the innerduct 10 with the conduit 12 when the innerduct 10 is being pulled through the conduit 12.

The above described innerduct is readily manufactured and provides a structure which allows optical fiber cables to be pulled through without snagging or excessive heat build-up due to friction and does not allow contact or alternation losses between adjacent fiber optic cables in other channels of the insert.

A flexible innerduct structure 100 comprising a second embodiment of the invention is shown in FIG. 4. Like the innerduct structure 10 in the first embodiment, the innerduct structure 100 in the second embodiment comprises strip-shaped layers of flexible woven material 102, 104, 106 and 108 that are joined along their longitudinal edge portions 110, 112, 114 and 116, respectively, by stitching 118. Each pair of adjacent layers defines a respective cable channel 121, 123 or 125. In accordance with the invention, the layers in each pair have differing widths between their longitudinal edges such that the wider layer in the pair bulges away from the narrower layer. This imparts open configurations to the channels 121, 123 or 125.

As in the innerduct 10, the open configurations of the channels 121, 123 and 125 in the innerduct 100 facilitate insertion of cables longitudinally through the channels 121, 123 and 125 by the use of respective pull lines 131, 133 and 135. This is because the spacing between the layers 102–108 helps to prevent them from being pulled along with the cables, and thus helps to prevent bunching-up of the innerduct 100 within the conduit under the influence of the cable and pull lines 131–135 moving longitudinally through the channels 121, 123 and 125.

As described above, the cross section of the innerduct 10 is defined by separate strips of fabric material that are interconnected at their longitudinal edge portions to define overlying layers 16, 18, 20 and 22. As shown in FIG. 4, the overlying layers 102, 104, 106 and 108 of the innerduct 100 also are interconnected at their longitudinal edge portions, but are defined by folded sections of a single strip 140 of fabric material. Two, three, four (FIG. 2) or more strips could be used to define overlying layers in accordance with the invention. Each strip is one of a plurality of successive strips that are joined together end to end to provide the innerduct with a length that may extend, for example, from three to four miles.

FIG. 5 is a schematic partial view of an optical fiber cable 150 to be installed in an innerduct constructed in accordance with the invention. The cable 150 includes a plastic sheath 152 containing a bundle of optical fibers 154. Preferably, each layer of the innerduct that receives the cable 150 is formed of a flexible plastic material that is specified with reference to the plastic sheath 152 so as to have a melting temperature not lower than, and most preferably higher than, the melting temperature of the plastic sheathing material. This helps to ensure that sliding friction will not cause the cable 150 to burn through the innerduct when the cable 150 is being pulled longitudinally through the innerduct. In accordance with this feature of the invention, the innerduct layers are preferably formed of nylon 6 so as to have a melting temperature of about 220 degrees C.

The resistance to cable burn-through can also be specified with reference to a pull line duct cutting test substantially similar to the test known as the Bellcore pull line duct cutting test. In accordance with this feature of the invention, the innerduct layer material is preferably specified such that a 0.25 diameter polypropylene rope will not burn through a test sample of the innerduct structure when pulled through the test sample at 100 feet per minute and 450 pounds tension for at least 90 seconds.

The innerduct layer material may further be specified with reference to the material of which the pull lines are formed.

In accordance with this feature of the invention, the layer material and the pull line material preferably have respective values of elongation percentage that are substantially equal for a given tensile load. If elongation of the innerduct differs substantially from that of a pull line, one of those structures may lag relative to the other when they are pulled together through a conduit in which they are to be installed together. The elongation percentages of the layer material and the pull line material are preferably not greater than about 75 percent at a peak tensile load, i.e., just prior to tensile failure, and are preferably within the range of about 15 to about 60 percent. A more preferred range extends from about 25 to about 40 percent. For example, nylon 6 is a preferred material and has an elongation of about 40 percent at a peak tensile load. Polyester is another preferred material and has an elongation of about 25 percent at a peak tensile load.

Other features of the invention relate to the tensile strength of the innerduct layer material. In an innerduct constructed in accordance with the invention, each layer preferably has a longitudinal tensile strength of at least about 12.5 pounds per inch of width. The longitudinal tensile strength of each layer may be within the range of about 12.5 to about 300 pounds per inch of width, and more preferably is within the range of about 50 to about 250 pounds per inch of width. However, the longitudinal tensile strength of each layer is most preferably within the range of about 100 to about 200 pounds per inch of width. For example, each layer 102, 104, 106 and 108 in the innerduct 100 may be formed of a woven fabric having both warp and fill yarns formed of nylon 6, with a longitudinal tensile strength of about 150 pounds per inch of width.

The interconnected layers should together provide the innerduct structure, as a whole, with a longitudinal tensile strength of at least about 90 pounds, but may provide a longitudinal tensile strength within the range of about 50 to about 5,000 pounds. A more preferred range is from about 125 to 4,500 pounds, and a range of about 1,250 to about 4,000 pounds is most preferable.

Additional features of the invention can be described with reference to FIG. 6. Specifically, FIG. 6 is a schematic view of a strip 160 of woven innerduct fabric material for use in accordance with the invention. The strip has warp yarns 162 extending along its length and has fill yarns 164 extending across its width. The fill yarns 164 are flexible but have a degree of rigidity or a resistance to crimping that helps the wider layers of the innerduct to retain their bulged condition relative to the adjacent narrower layers, as shown for example in FIG. 4, without being crimped or creased inward toward the adjacent narrower layers. Such crimping or creasing is of less concern in the longitudinal direction of the layers. Therefore, the warp yarns 162 of FIG. 6 may have a crimp resistance that is less than the crimp resistance of the fill yarns 164. Such is the case in the preferred embodiment of the strip 160 in which the warp yarns 162 are formed of polyester, which has a first crimp resistance, and the fill yarns 164 are formed of nylon 6, which has a second, greater crimp resistance. Polyester is preferably used for the warp yarns 162 so as to minimize the elongation differential with the pull lines, which also are preferably formed of polyester.

The crimp resistance can be expressed in terms of the crimp recovery angle. The crimp recovery angle is a measure of the degree to which a sample of the material returns toward a flat unfolded condition after having once been folded 180 degrees about a fold line in accordance with AATCC method 66. For example, a particular innerduct layer material constructed in accordance with the invention has heatset polyester warp yarns and nylon 6 fill yarns. That material was found to have a crimp recovery angle of 70 degrees in the warp direction and 135 degrees in the fill direction. A similar material with greige polyester rather than heatset polyester was found to have a crimp recovery angle of 50 degrees in the warp direction and 125 degrees in the fill direction. A material having heat set polyester yarns in both the warp and fill directions was found to have a crimp recovery angle of 90 degrees in the warp direction and 75 degrees in the fill direction. A similar material having only greige nylon yarns in both the warp and fill directions is found to have a crimp recovery angle 130 degrees in the warp direction and 120 degrees in the fill direction.

The innerduct layer material should be rigid enough to resist collapsing upon itself or bunching up under the influence of the pull lines and cables, but also should be flexible enough to be pulled easily through turns and undulation in the duct in which it is installed. The INDA IST90.3 test procedure is a method of determining the rigidity of the innerduct layer material. In this procedure, a test sample of flexible material is laid out over a slotted surface. A blade is then used to force the material through the slot. The results are expressed in terms of the applied force. In accordance with the invention, a strip of innerduct layer material extending longitudinally across the slot will be forced to bend along a transversely extending fold line. Such a strip will preferably have rigidity test results within the range of about 950 to about 1,750 grams. A strip of innerduct layer material extending transversely across the slot will be forced to bend about a longitudinally extending fold line, and will preferably have rigidity test results within the range of about 150 to about 750 grams. The strip of innerduct layer material will thus have a lesser rigidity across its width. The correspondingly greater degree of flexibility across its width helps to avoid creasing and thereby helps the wider layers of the innerduct to retain their bulged condition relative to the adjacent narrower layers, as described above with reference to FIG. 4. For example, the strip 160 (FIG. 6) of woven innerduct fabric material has fill yarns 164 that are formed of nylon 6. Such yarns are found to have rigidity test results within the range of about 350 to about 550 grams. The warp yarns 162 are formed of polyester. Such yarns are found to have rigidity test results within the range of about 1,250 to about 1,450 grams.

The coefficient of friction also can be specified for the innerduct layer material in accordance with the invention. In accordance with this feature of the invention, the innerduct layer material preferably has a dry static coefficient of friction, based on high density polyethylene on the material with a longitudinal line of action, within the range of about 0.010 to about 0.500. This range is more preferably from about 0.025 to about 0.250, and is preferably from about 0.035 to about 0.100. For example, a woven innerduct layer having polyester warp yarns and nylon 6 fill yarns was found to have a dry static coefficient of friction, based on high density polyethylene on the material with a longitudinal line of action, of 0.064. A similar material having heat set polyester warp yarns had a corresponding coefficient of friction of 0.073. A material having heat set polyester yarns in both the warp and fill directions had a corresponding coefficient of friction of 0.090, and a material having nylon 6 greige yarn in both the warp and fill directions had a corresponding coefficient of friction of 0.067. These coefficients of friction differed for transversely directed lines of action on the four foregoing materials and were, respectively, 0.085, 0.088, 0.110, and 0.110. The dynamic or sliding coefficients of friction for these materials, again based on high density polyethylene on the material with a longitudinal line of action, were found to be 0.063, 0.56, 0.058, and 0.049, respectively. The transverse counterparts to these dynamic values were 0.064, 0.067, 0.078, and 0.075, respectively. Although these tested values of sliding coefficient of friction are most preferred, the invention comprises broader ranges such as the range from about 0.0050 to about 0.1250, as well as an intermediate range of about 0.0075 to about 0.0625, and a narrower range of about 0.0100 to about 0.0250.

Additional features of the invention relate to the open configurations of the channels in the innerduct structures. Preferably, in addition to the differing widths of the adjacent layers, the invention further comprises a material property of the layers that contributes to the open configurations of the channels defined by and between the layers. This material property of the layers is a spring-like resilience that enables the innerduct structure to maintain a free standing condition such as, for example, the condition in which the innerduct structure 100 is shown in FIG. 7. When the innerduct 100 is fully flattened against the surface 200 by an actuator 202 under the influence of an applied test force F, it will preferably rebound fully or substantially fully to its original freestanding condition as the force F is relieved upon retraction of the actuator 202. By "fully flattened" it is meant that the wider layers 104, 106 and 108 are deflected toward and against the narrowest layer 102 until the applied test force F reaches a peak level at which no further compression will occur without damage to the innerduct 100. This fully flattened condition will include folds between overlapping plies of the wider layers 104, 106 and 108. Preferably, the innerduct 100, or another innerduct constructed in accordance with the invention, will not undergo a next subsequent compression in the same manner under the influence of a peak applied test force that is less than about 85 to 100 percent of the previous peak applied test force. This indicates the correspondingly high degree to which the innerduct tends to retain an open configuration for passage of cables through the cable channels.

FIG. 8 is a view similar to FIG. 6 showing an alternative strip 200 of innerduct layer material constructed in accordance with the present invention. Like the strip 160 shown in FIG. 6, the strip 200 comprises a woven structure having warp yarns 202 and fill yarns 204. The strip 200 further comprises a barrier 206 that blocks air from flowing through the strip 200 between the warp yarns 202 and the fill yarns 204. Such impervious strips enable a cable to be blown through the innerduct structure without a loss of pneumatic pressure that could otherwise result from the passage of air outward through layers.

Impervious strips could be used to define all of the layers of the innerduct structure, but would more preferably be used to define the outermost layers of the innerduct structure. For example, a pair of strips like the strip 200 could be used to define the outermost layers 16 and 22 of the innerduct structure 10 described above. A single strip like the strip 200 could be used to define all of the layers 102–108 of the innerduct structure 100 described above. In the embodiment shown in FIG. 8, the barrier 206 is a thin layer of plastic material that is bonded to the yarns 202 and 204 in a heat lamination process. If a plastic air barrier like the layer 206 is included in the innerduct structure at a location facing inward of a cable channel, it is preferably formed of a plastic material having a melting temperature that is not less than the melting temperature of the plastic sheathing material on the cable that is to be blown through the channel.

In another embodiment of the present invention, the flexible innerduct partitioning device may be made from fire resistant materials, particularly for use in buildings and other structures. Building codes require certain levels of fire resistance and limit levels of smoke generation for structural components, so any flexible innerduct used for such purposes would be required to meet such codes. A fire resistant flexible innerduct partitioning device may be installed within buildings, and particularly within HVAC systems, vertical and horizontal open shafts or utility spaces, such as elevator shafts, electrical cable trays, EMT duct systems, etc. Most building installations do not require extensive lengths of cable or innerduct, and are usually pulled through less than 1000 feet. For installations of these short lengths of cable and innerducts, lubricants are generally not required. Further, it should be understood that the innerduct may be used for such applications without being installed within a pipe or duct system.

In order to provide a fire resistant flexible innerduct device, the structure described above may be manufactured in one embodiment using fabric made from fiberglass yarns. In one preferred embodiment, the glass yarns are in the range of 1800 yards/lb to 22,500 yards/lb, and the fibers are woven into a plain weave structure. The fiberglass yarns may be coated with PVC or some other acceptable material, including by way of example silicone, acrylics, polyethylene or other olefins. The fiberglass fabric can be coated with binder, or the individual yarns may be coated prior to fabric formation. The coating may be used to provide protection to the brittle glass yarns, to add stability to the fabric, or to provide the necessary rigidity to the fabric to allow the chambers to be biased toward an open configuration. Alternatively, a multi-component yarn may be used, which has a glass core, wrapped with melamine, then wrapped with a fire resistant polyester. This alternative multi-component yarn is considered to be a core-sheath type of yarn.

In another alternate embodiment, flame resistance may be imparted to the flexible innerduct structure by using other types of materials, including aramid fibers, melamine fibers, polyvinylidene fluoride (PVDF) fibers, or Alumina-Boria-Silica (ceramic) fibers.

Yet another method for imparting flame resistance to a flexible innerduct structure includes extruding yarn with a flame-retardant additive in the base polymer, such as polyester and nylon. Potential additives that may be used in such an extrusion process include intumescent compounds including alumina trihydrate, magnesium oxides, magnesium borates; other boron containing compounds such as zinc borate, ammonium phosphate; residue forming carbonaceous materials including pentaerythritol, alkyd resins, or polyols; nitrogen containing compounds including melamine, and dicyandiamide, antimony oxides; halogenated organics, such as decabromodiphenyl oxide; phosphorous containing compounds such as ammonium phosphates; other phosphate salts, and organic phosphates. These flame retardants are commonly used in combination with each other such as a halogenated hydrocarbon system with antimony oxide (such as Dechlorane Plus®).

Still another method of imparting flame retardant to a flexible innerduct structure is to treat the material with a flame retardant coating. Possible flame-retardants that may be used for such a coating include the list set forth above, with or without a binder system.

One particularly effective method of producing a fire resistant flexible innerduct structure is to extrude Nylon 6 resin with a melamine cyanurate additive at approximately 6% to 8% by weight. Thus, the structure of this embodiment may include a fabric having 520 denier Nylon 6 with a 6.75% melamine cyanurate in both the warp and fill directions, in a plain weave of preferably a 30×35 construction. It should be understood that the additive may comprise from 2% to 12% by weight of the extruded yarn, preferably 4% to 10%, and more preferably 6% to 8%.

It should be understood that pull tapes also may be rendered fire resistant by using any of the methods or materials set forth above.

The invention has been described with reference to preferred embodiments. Those skilled in the art will perceive improvements, changes and modifications. Such improvements, changes and modifications are intended to be within the scope of the claims.

What is claimed is:

1. Apparatus comprising:
    a flexible structure configured to contain a cable, said structure comprising flexible material adjoined in such a way as to define at least one longitudinal channel, each channel configured to carry a cable;
    wherein said flexible material comprises synthetic material containing a flame retardant additive; and
    wherein said flame retardant additive is melamine cyanurate and comprises 6% to 8% by weight of said synthetic material.

2. The apparatus set forth in claim 1, wherein said synthetic material is selected from the group consisting of nylon, polyester, polyolefins, polypropylene and any combination thereof.

3. The apparatus set forth in claim 1, wherein said flexible material is made from yarns having a denier range of 200 denier to 1000 denier.

4. The apparatus set forth in claim 3, wherein said yarn is a monofilament.

5. The apparatus set forth in claim 1, wherein said synthetic material is woven into a plain weave.

6. The apparatus set forth in claim 5, wherein said plain weave is a 30×35 construction.

7. The apparatus set forth in claim 1, wherein said flexible textile material defines a plurality of longitudinal channels.

8. A method of manufacturing a fire resistant flexible innerduct structure, said method comprising the steps of:
    providing a synthetic polymer and a fire resistant additive to an extruder;
    extruding said synthetic polymer and said additives to form flexible yarns; and using said flexible fibers to form a structure defining at least one longitudinal channel configured to carry a cable;
    wherein the step of using said flexible yarns to form said structure includes the step of weaving said yarns into a fabric and joining said yarns together in such a way as to form said structure.

9. The method set forth in claim 8, wherein said synthetic polymer is selected from the group consisting of: nylon, polyester, polyolefins, polypropylene, and any combination thereof.

10. The method set forth in claim 8, wherein said additive is selected from the group consisting of: alumina trihydrate, magnesium oxides, magnesium borates, zinc borate, ammonium phosphate, pentaerythritol, alkyd resins, polyols, melamine, melamine cyanurate, dicyandiamide, antimony oxides, halogenated organics, decabromodiphenyl oxide, ammonium phosphates, and organic phosphates and any combination thereof.

11. The method set forth in claim 10, wherein said melamine cyanurate additive comprises about 6% to 8% of the weight of said extruded fiber.

12. The method set forth in claim 8, wherein said weaving step results in a plain weave fabric.

13. The method set forth in claim 8, wherein said flexible yarns are selected from the group consisting of monofilament, multifilament, multi-component yarns, or any combination thereof.

14. Apparatus comprising:
    a flexible textile structure configured to contain a cable, said structure comprising flexible material adjoined in such a way as to define at least one longitudinal channel, each channel configured to carry a cable;
    wherein said flexible material comprises fabric made of multi-component fibers, and wherein said multi-component fibers include a glass core wrapped with a layer of melamine.

15. The apparatus set forth in claim 14, wherein said multi-component fibers farther include a layer of fire resistant polyester.

* * * * *